Figure 1:
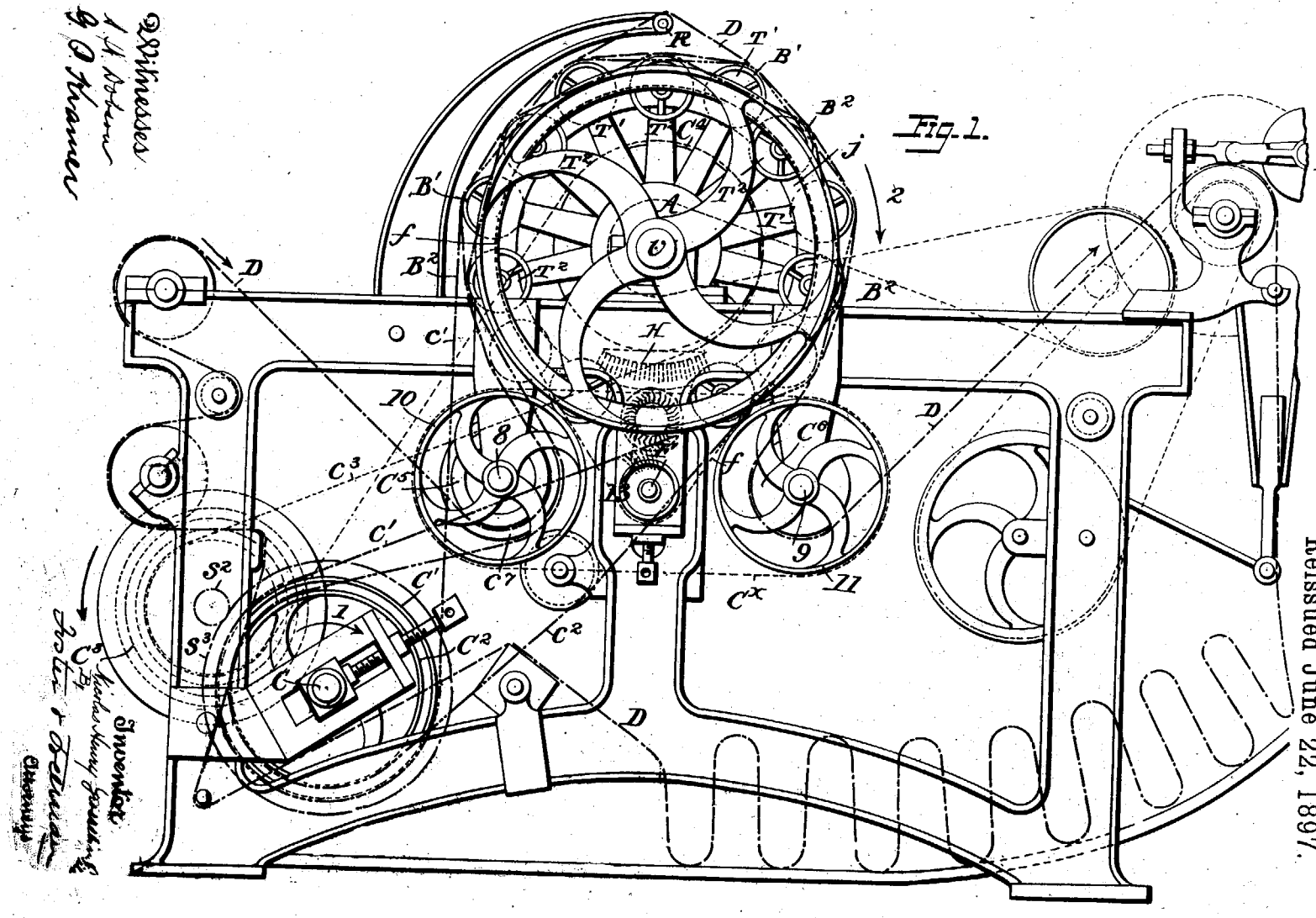

N. H. GROSSELIN, FILS.

5 Sheets—Sheet 1.

GIG MILL.

No. 11,612.

Reissued June 22, 1897.

Witnesses
A. H. Dobson
G. P. Kramer

Inventor
Nicolas Henry Grosselin Fils
By
Foster & Freeman
Attorneys

5 Sheets—Sheet 2.

N. H. GROSSELIN, FILS.

GIG MILL.

No. 11,612. Reissued June 22, 1897.

Witnesses
G. P. Kramer
A. A. Dobson

Nicolas Henry Grosselin Fils
Inventor
By
Foster & Freeman
Attorneys

5 Sheets—Sheet 3.

N. H. GROSSELIN, FILS.

GIG MILL.

No. 11,612. Reissued June 22, 1897.

Witnesses
A. A. Doberow
G. P. Kramer

Inventor
Nicolas Henry Grosselin fils
By Foster & Freeman
Attorneys

5 Sheets—Sheet 4.

N. H. GROSSELIN, FILS.

GIG MILL.

No. 11,612. Reissued June 22, 1897.

Witnesses
A. N. Dobson
G. P. Kramer.

Inventor
Nicolas Henry Grosselin fils
By Foster & Freeman
Attorneys

N. H. GROSSELIN, FILS.

GIG MILL.

5 Sheets—Sheet 5.

No. 11,612.

Reissued June 22, 1897.

Witnesses

G. P. Kramer

A. A. Dobson

Nicolas Henry Grosselin fils

Inventor

By

Foster & Freeman

Attorneys

UNITED STATES PATENT OFFICE.

NICOLAS HENRY GROSSELIN, FILS, OF SEDAN, FRANCE, ASSIGNOR TO CHARLES HEAP, OF ROCHDALE, ENGLAND.

GIG-MILL.

SPECIFICATION forming part of Reissued Letters Patent No. 11,612, dated June 22, 1897.

Original No. 485,929, dated November 8, 1892. Application for reissue filed December 28, 1893. Serial No. 496,334. Patented in France November 25, 1887, No. 187,203; in Belgium March 7, 1888, No. 80,913; in England April 11, 1888, No. 5,394; in Italy December 14, 1888, No. 24,592/408; in Spain January 24, 1889, No. 9,144; in Switzerland February 19, 1889, No. 501; in Austria-Hungary February 25, 1889, No. 9,132 and No. 23,070; in Russia March 4, 1889, No. 11,867, and in Germany July 27, 1889, No. 55,784.

*To all whom it may concern:*

Be it known that I, NICOLAS HENRY GROSSELIN, Fils, a citizen of France, residing at Sedan, France, have invented certain new and useful Improvements in Gig-Mills, (which have been patented to me in France November 25, 1887, No. 187,203; in Belgium March 7, 1888, No. 80,913; in Germany July 27, 1889, No. 55,784; in Great Britain April 11, 1888, No. 5,394; in Switzerland February 19, 1889, No. 501; in Italy December 14, 1888, No. 24,592/408; in Spain January 24, 1889, No. 9,144; in Austria-Hungary February 25, 1889, No. 9,132 and No. 23,070, and in Russia February 20 and March 4, 1889, No. 11,867,) of which the following is a specification.

This invention relates to gig-mills of that kind in which there is a rotating drum around which are arranged working or teazeling rolls having a varying rotary movement independent of the movement of the drum.

The characteristic feature of the present invention is that some of the teazeling-rolls act in a reverse way to the others, although they are mounted on the same drum, which turns only in one direction. By this means the cloth or goods can be teazeled or dressed with two sets of napping-rolls on the same drum both in the direction of the nap and against the nap, which is indispensable in many goods and which has hitherto been effected either by the use of several drums turning in reverse directions to each other or by submitting the cloth more than once to the action of the same drum, turning the cloth around end for end each time. By these methods the teazeling in the two directions instead of being simultaneous, as in my improvement, is effected by successive operations, and there is a loss of useful effect, especially in dealing with fabrics for which a short thick nap is desired. For the purposes of my invention I arrange the working rollers the reverse of one another—that is to say, with the points of the cards or teazels on one roller in the direction of the rotation of the drum and the points of the card on the next following roller in the contrary direction or in some instances radial. In such arrangement half of the rollers are provided with the teeth pointed in one direction and the other half with their teeth pointed in another direction. The relation of the rollers can be varied—as, for instance, by arranging two or three rollers with all of their teeth working with the nap in succession with rollers with the teeth working against the nap—the particular arrangement depending upon the nature of the fabric to be treated and the character of finish required. Further, all the rollers may be those which work against the nap—that is to say, all the cards that have their points turned in the direction which is the reverse of the rotation of the drum—which is of advantage for very light fabrics, as it enables the machine to act more energetically without risk of fretting the fabric.

In order to simultaneously strip or clean the cards of the two sets of rolls having teeth differently arranged, I make use of two sets of brushes or strippers acting simultaneously, one inside and the other outside of the drum, and with this object the rollers which act in one drection—for instance, those which act against the nap—are arranged at a greater distance from the center than the others, and the stripper placed outside the drum cleans one set of rollers, while the internal stripper cleans the other set.

In a machine constructed as above set forth it is necessary to provide for varying the energy of the cards—that is to say, to give more or less of a rotation to the working rolls in respect to the movement of the drum. To secure this result with two sets of rollers working in opposite directions, each roller-shaft is provided with a pulley of a djameter equal to that of the roller, the pulleys of one set of rolls being upon one vertical plane and those of the other set in another vertical plane, and the pulleys of the rollers that work with the nap are placed, as usual, outside the heads of the drum, and the pulleys of the rollers that work against the nap are, on the contrary, placed inside the heads, and one set of pulleys is worked with a cross-belt and the other with an uncrossed belt, or the two sets of napping-rolls are otherwise so driven that although all the rollers turn in the same direction if the speed of the driving-shaft be increased the rollers that work with the nap will turn more slowly in a backward direction and those that work against the nap will turn more quickly in the same direction, any change in the speed varying the action of the two sets of cards at the same time and in the same proportion.

My invention also consists in other features of construction hereinafter set forth, and illustrated in the accompanying drawings, in which—

Figure 2:
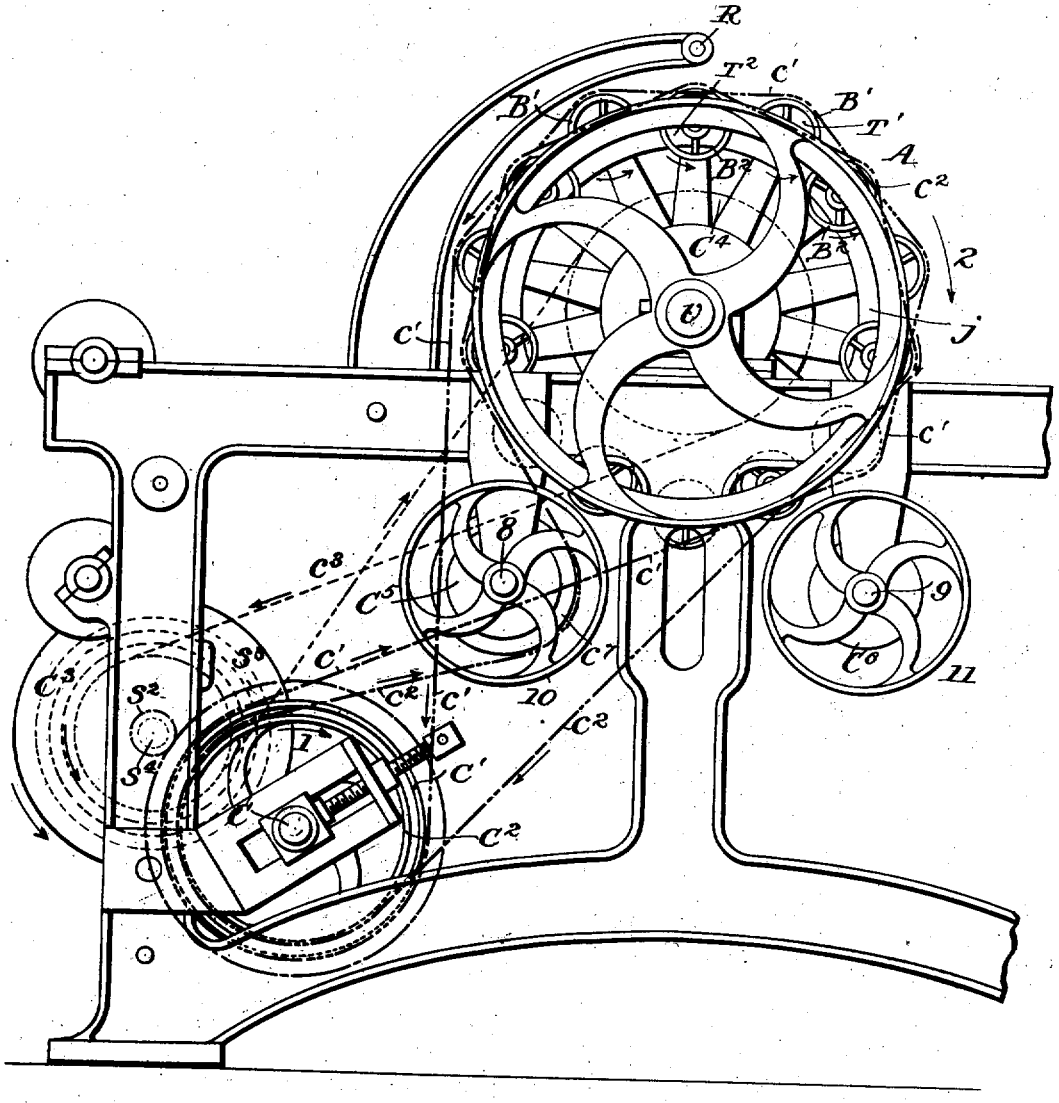
Figure 3:
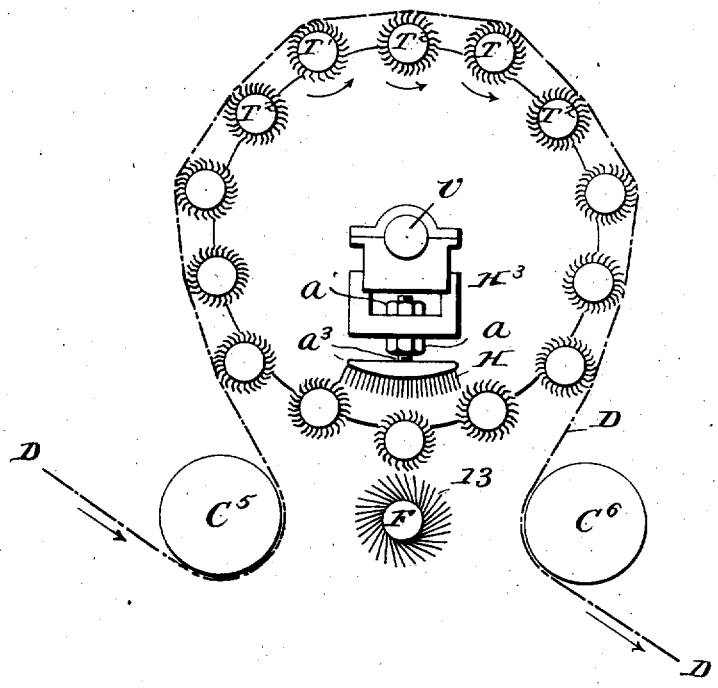
Figure 4:
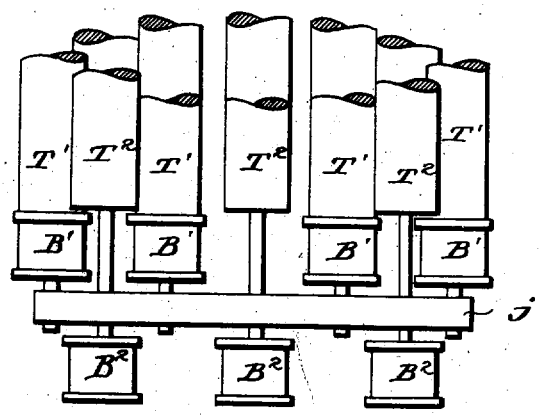
Figure 5:
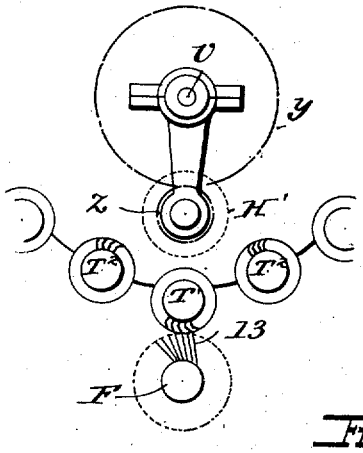
Figure 6:
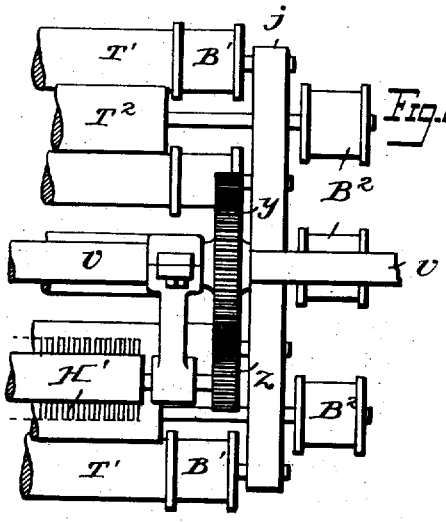
Figure 7:
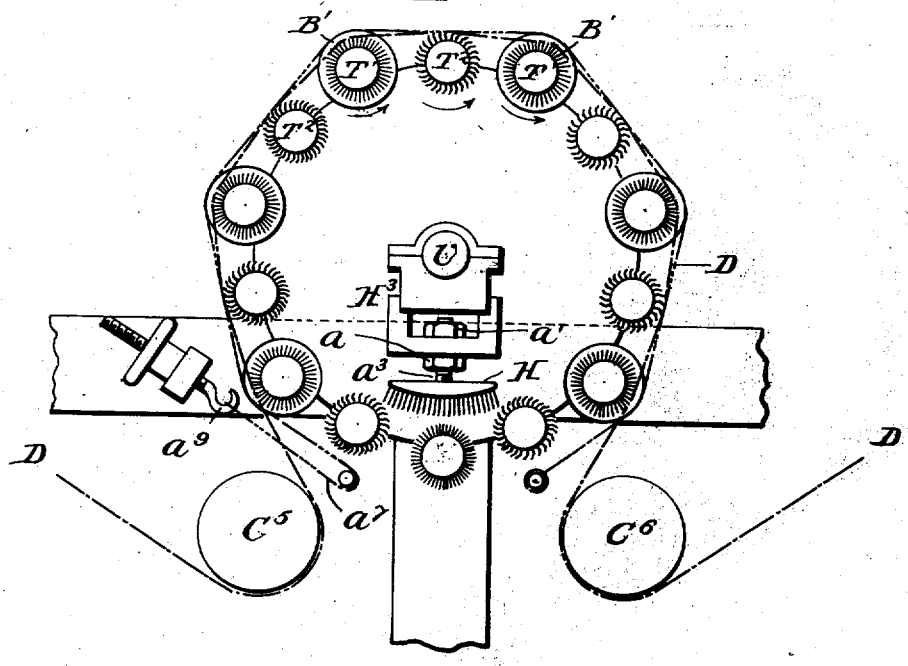
Figure 8:
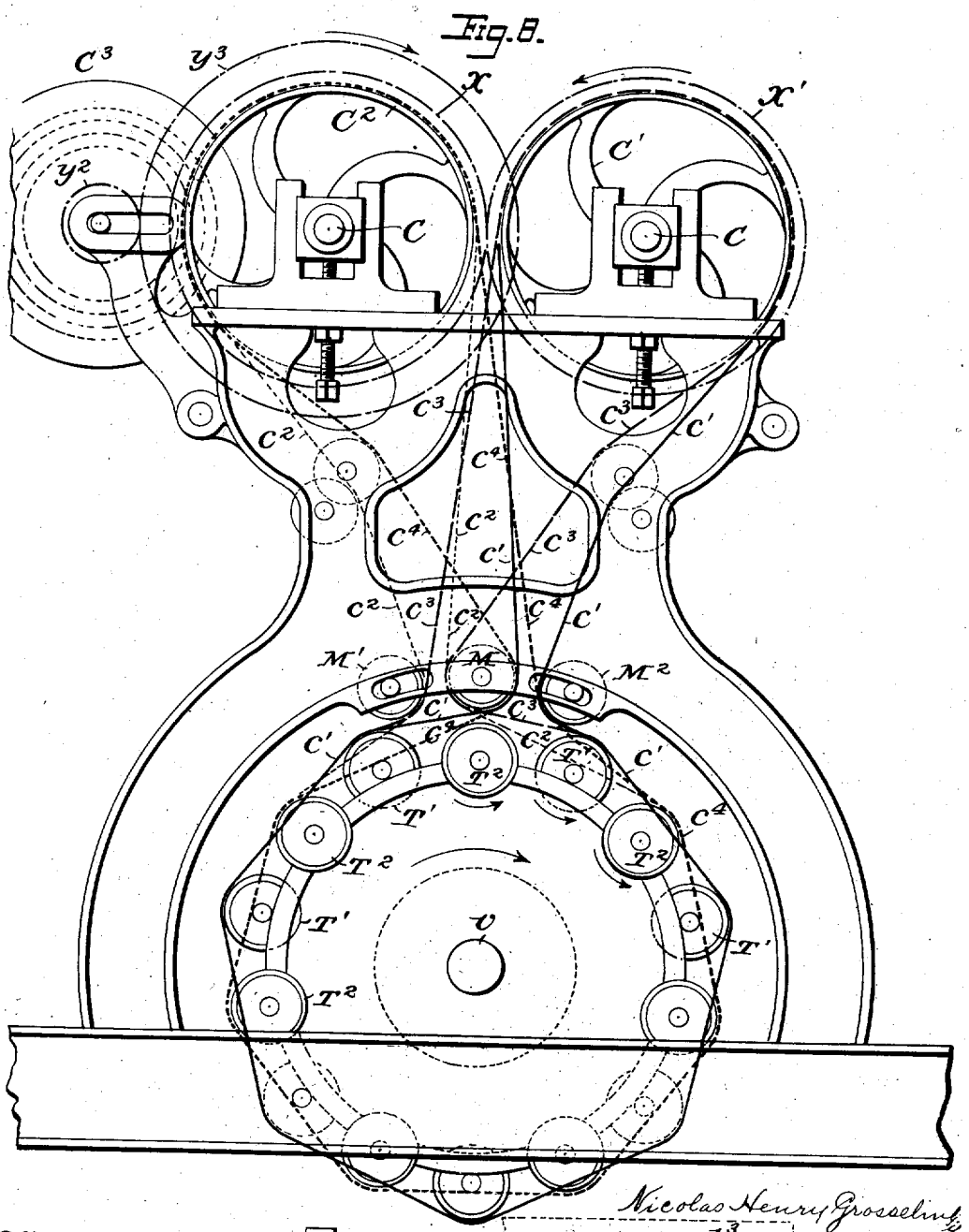
Figure 8:
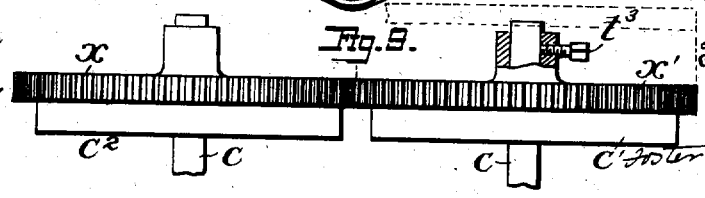

Figure 1 is a side elevation of a gig-mill embodying my invention. Fig. 2 is an enlarged side elevation of part of the same, the line of the fabric not being shown in order to more clearly illustrate the positions of the belts. Fig. 3 is a diagrammatic illustration of the drum, rollers, stripper, and fabric supported directly by the two sets of rolls. Fig. 4 is a plan of the drum, showing one end of the same. Fig. 5 is a partial end view, and Fig. 6 is a partial side elevation, of the drum, illustrating a modification in connection with the strippers. Fig. 7 is a diagrammatic elevation of the drum, illustrating another modification. Fig. 8 is an elevation of a modification illustrating two driving-shafts for driving the rollers. Fig. 9 is a plan illustrating a detail of Fig. 8.

Referring to Figs. 1 to 6, it will be noted that I provide a drum A, consisting of a shaft $v$ and two heads or disks $j$ and napping-rolls having journals turning in bearings of the heads. The drum may carry any desired number of rollers, in the present instance fourteen, of which the seven marked T′ work against the nap and the seven marked $T^2$ work with the nap.

The drum A derives the requisite action of rotation in the direction of its arrow 2 by any suitable means, as by a driving-belt passing from a shaft outside of the machine to a pulley on the shaft $v$, as usual. A counter-shaft C is driven from the drum-shaft $v$, and in turn the napping-rolls are driven from the counter-shaft. Thus a cross-belt $c^3$ passes from a pulley $C^4$ on the drum-shaft $v$ to a step-pulley $C^3$, from which motion is imparted by gears $s^2$ $s^3$ (shown in dotted lines, Fig. 1) to the counter-shaft, and on the counter-shaft C are mounted two pulleys C′ $C^2$.

The pulley C′ carries a cross-belt $c'$, which passes around a series of pulleys B′, Fig. 4, arranged in one vertical plane on the ends of the shafts of the rollers T′, which work against the nap. The pulley $C^2$ carries a belt $c^2$, which is uncrossed, but passes around a guide-pulley $c^7$ on a shaft 8 and around pulleys $B^2$, arranged upon the shafts of the napping-rollers $T^2$, which work with the nap, the pulleys $B^2$ being on a vertical plane parallel to that in which the pulleys B′ travel.

The arrangement of the pulleys B′ $B^2$ and the rollers T′ $T^2$ will best be understood from Figs. 2 and 4, where it will be seen that the pulleys B′ $B^2$ are equal in diameter to the rollers T′ $T^2$; that the pulleys B′ are within the head $j$ of the drum and the pulleys $B^2$ outside of said head. If the shaft C is stopped and the drum A driven in the direction of its arrow, Fig. 2, the cards of all the rollers have a backward development equal to the forward development of the drum and do not act upon the cloth D, which may be supported in any suitable manner upon the drum. This is the minimum energy of the drum. If the shaft C is driven in the direction of its arrow 1, the rollers $T^2$ will have their backward movements diminished and the rollers T′ will have their backward movements accelerated in the same proportion. The rollers will therefore operate upon the fabric to effect an amount of work equivalent or in proportion to the speed of the shaft C. Different speeds may be imparted to the shaft C in relation to the rotation of the drum by shifting the belt $c^3$ upon the pulleys $C^3$ $C^4$ or by any other suitable kind of devices for effecting the result.

It will be seen that the driving-pulley C′ for actuating the cross-belt $c'$ and the rollers T′, which act against the nap, is larger than the driving-pulley $C^2$, actuating the belt $c^2$, and rollers $T^2$, working with the nap. The object of this difference is to compensate for the onward travel of the fabric, which diminishes or neutralizes to a proportional extent the action of the rollers that act with the nap and increases the action of those that act against the nap. Other means than belts may be employed for transmitting motion to the working rollers, but I do not here claim the same.

The fabric D may extend round the drum and be supported directly by both sets of rollers, as shown in Figs. 3 and 7; but in Fig. 1 I have shown it as elevated at one point by passing over a guide-roller R. It is fed forward by two pulleys $C^5$ $C^6$ upon two shafts 8 9, carrying the pulleys 10 11, around which passes a belt $C^\times$.

Where teazeling-rollers in two sets working in opposite directions are employed, it becomes necessary to provide two strippers, one for each set of teazeling-rollers.

As shown in Figs. 1 and 3, there is a rotary exterior stripper 13 upon the shaft F, driven by a belt $f$ from a pulley on the shaft $v$, and there is an interior stripper H, which is attached to hangers $H^3$, depending loosely from the shaft $v$ of the drum A. A screw-pin $a^3$ extends upward through an opening in each hanger and carries two nuts $a$ $a'$, by means of which the stripper may be adjusted vertically. As shown in the said figures, the stripper H consists of a card-plate having straight teeth, their ends lying in a curve; but instead the internal stripper may be a revolving brush H′, Figs. 5 and 6, upon a shaft carried by hangers and driven from the shaft $v$ through the medium of gears $y$ $z$. In any case the flock or waste stripped from inside the rollers falls below the drum through the space between the rollers.

In order to enable each stripper to act to better advantage upon one set of napping-rollers alone, one set of rollers coincides with a larger and the other with a smaller circumference. Thus the rollers T′ are arranged in a circle at a greater distance (say one-half an inch) from the center of the shaft $v$ than the rollers $T^2$, so that the former are acted upon only by the exterior stripper and the latter by the interior stripper.

Various modifications may be effected without departing from the spirit and nature of my invention. For example, instead of having each roller which works with the nap alternate with a roller which works against the nap I may place two, three, or more rollers working with the nap between two rollers working against the nap, and vice versa, the particular nature depending upon the fabric to be treated. Again, it may be useful in some cases to actuate the oppositely-acting napping-rollers by belts running over pulleys upon different shafts. Figs. 8 and 9 illustrate such a construction. In these figures C′ $C^2$ are pulleys on two parallel shafts C C for operating the two sets of rollers, the said shafts being connected by toothed wheels $x$ $x'$, which are removably mounted upon the shafts for the purpose of interchanging gears to vary the relative speeds of the two shafts or to disconnect them when one is to be held stationary.

If desired, there may be two belts for each set of napping-rolls. In such case each napping-roll has two pulleys, one at each end, and one belt passes around the pulleys at one end of the drum and the other around the pulleys at the opposite end of the drum, and guide-pulleys are so arranged to guide said belts that one of the pulleys on the shaft of each roller shall always be in contact with one of the belts. As shown in Fig. 8, a belt $c'$ passes around the pulleys of the rollers T′ at one end of the drum, beneath a guide-roll M at the right of the latter, up and over a pulley C′, and down and beneath a guide-roll $M^2$, and another belt $C^3$ at the opposite end of the drum passes around the pulleys T′ at that end, beneath a guide-pulley M′, up and around a pulley C′, and down to the left of and then beneath a guide-pulley M. The belt $c^2$ passes around the pulleys at one end of the rollers $T^2$, passes around a roll in line with the guide-roll M′, around the pulley $C^2$, down and at the left of a pulley in line with the pulley M, and thence to the right, while the belt $C^4$, that passes around the pulleys of the rollers $T^2$ at the opposite end of the drum, passes first beneath and at the right of the pulley on line with the pulley M, around the pulley $C^2$, and down and to the left of and beneath a pulley on line with the pulley $M^2$. This arrangement, while more expensive than the first described, offers advantages, as it permits the operation of teazeling against the nap to be effected independently of the teazeling with the nap. For instance, one of the toothed wheels, say the tooth $x'$, may be removed from gear with the tooth $x$ by adjusting it upon its shaft, on which it is secured, as by a set-screw $\ell^3$, when the action of the driving-pulley C′ upon the teazeling-rolls T′ immediately ceases, the other set of rollers $T^2$ continuing to be actuated from the pulley $C^2$, which continues to revolve.

Motion is imparted from the shaft of a pulley $C^3$ through the medium of a pinion $y^2$ of said shaft gearing with a toothed wheel $y^3$ on the shaft of the pulley $C^2$, a cone-pulley on the shaft of the pulley $C^3$ (shown in dotted lines) being belted to a driving-pulley (dotted lines) on the shaft $v$.

The toothed wheels $x$ $x'$ may be exchanged for others of different relative diameters, whereby the working energy against the nap is modified in its relation to the working energy with the nap. Other known means of varying the relative movement of the pulleys C′ $C^2$ may be used instead of toothed wheels.

The use of two shafts for driving the two sets of rollers, with means for varying the relative movements of the toothed shafts, offers great facility in operation and regulation of the machine, adapting the latter to be used in operation upon goods of different kinds.

For some purposes one set of rolls—as, for instance, those working against the nap—may be used only as drawing-rolls for maintaining and regulating the tension of the fabric between the working rolls. Such a modification is shown in Fig. 7, and is useful when the goods do not require simultaneous teazeling with and against the nap. In this case the rollers T′ are fitted with cards having straight teeth or are covered with plush, emery, or other material which will exert a draft or take a hold upon the fabric. These rollers T′ may be driven by a fixed strap or belt $a^7$, secured to the frame at one end, and at the other to a tension device—as, for instance, an adjustable hook $a^9$.

Where the speed of the fabric and size of the driving-pulleys require it, it is necessary, in order to cause the cards of working rollers to work against the nap, to make the diameter of their pulleys B′ greater than that of the rollers themselves, and the difference should be in proportion to the forward speed of the fabric. Thus it will be understood that if the fabric is required to advance thirty-six feet per minute the rollers should turn backward the amount that the drum turns forward, less thirty-six feet. The other rollers $T^2$, which work with the nap, are driven in the way first described by an independent belt.

It will be noted that the term "working" or "card" rollers wherever employed in this specification and claims is not confined to teazeling-rollers, although it includes them, and includes such drawing-rollers as just described.

What I claim as my invention is—

1. In a gig-mill, the combination of a drum with one series of working or card rollers mounted on the said drum and acting in one direction, and another series of working or card rollers acting in the opposite direction, and means for positively operating the two series of rollers to vary their speed with respect to the speed of rotation of the drum, substantially as described.

2. In a gig-mill the combination with a drum, of a series of rotary teazeling-rollers mounted on the same and working with the nap, and a second series of teazeling-rollers also mounted on the drum and working against the nap, and means for positively operating the two series of rollers, all substantially as described.

3. In a gig-mill, the combination of a drum and two series of teazeling-rollers mounted on the drum, one series working with the nap, the other series working against the nap, and adjustable means for operating each of said series of rollers with variable movement in respect to the rotation of the drum, and also in respect to the rotation of each other, all substantially as described.

4. The combination of a drum, two sets of napping-rolls carried thereby, and driving devices for turning one set at a different speed from the other, substantially as described.

5. The combination of a drum, two sets of napping-rolls carried thereby, with their teeth set in different directions, and means for turning those against the nap at a greater speed than those set with the nap, substantially as described.

6. In a gig-mill, a drum and two series of working rollers adapted to act in opposite directions and mounted thereon and provided with pulleys of equal diameters with said working rollers, in combination with two pulleys, one for each series of working rollers, and two driving-belts for the pulleys, all substantially as described.

7. In a gig-mill, the combination with a drum and two series of teazeling-rollers mounted thereon and adapted to work with and against the nap respectively, means for operating said rollers, and an external and internal stripper, all substantially as described.

8. In a gig-mill, the combination of a drum and two series of teazeling-rollers mounted thereon, and adapted to work with and against the nap respectively, one series being mounted at a greater distance from the center of the drum than the other, means for operating the said rollers, and an external and an internal stripper, all substantially as and for the purpose set forth.

9. In a gig-mill, the combination of a drum carrying a series of teazeling-rollers with an internal stripper suspended from the shaft of the drum, all substantially as described.

10. In a gig-mill, the combination with a drum carrying series of teazeling-rollers, of an internal stripper consisting of a rotary card suspended from the shaft of the drum, all substantially as described.

11. In a gig-mill, the combination with a drum carrying a series of teazeling-rollers, of an internal stripper consisting of a rotary card suspended from the drum-shaft, a toothed wheel keyed to the drum-shaft, and a pinion attached to the stripper, all substantially as described.

In testimony whereof I have hereunto signed my name in the presence of two subscribing witnesses.

NICOLAS HENRY GROSSELIN, FILS.

Witnesses:
F. MENNOUS,
CLYDE SHROPSHIRE.